United States Patent Office 2,934,024
Patented Apr. 26, 1960

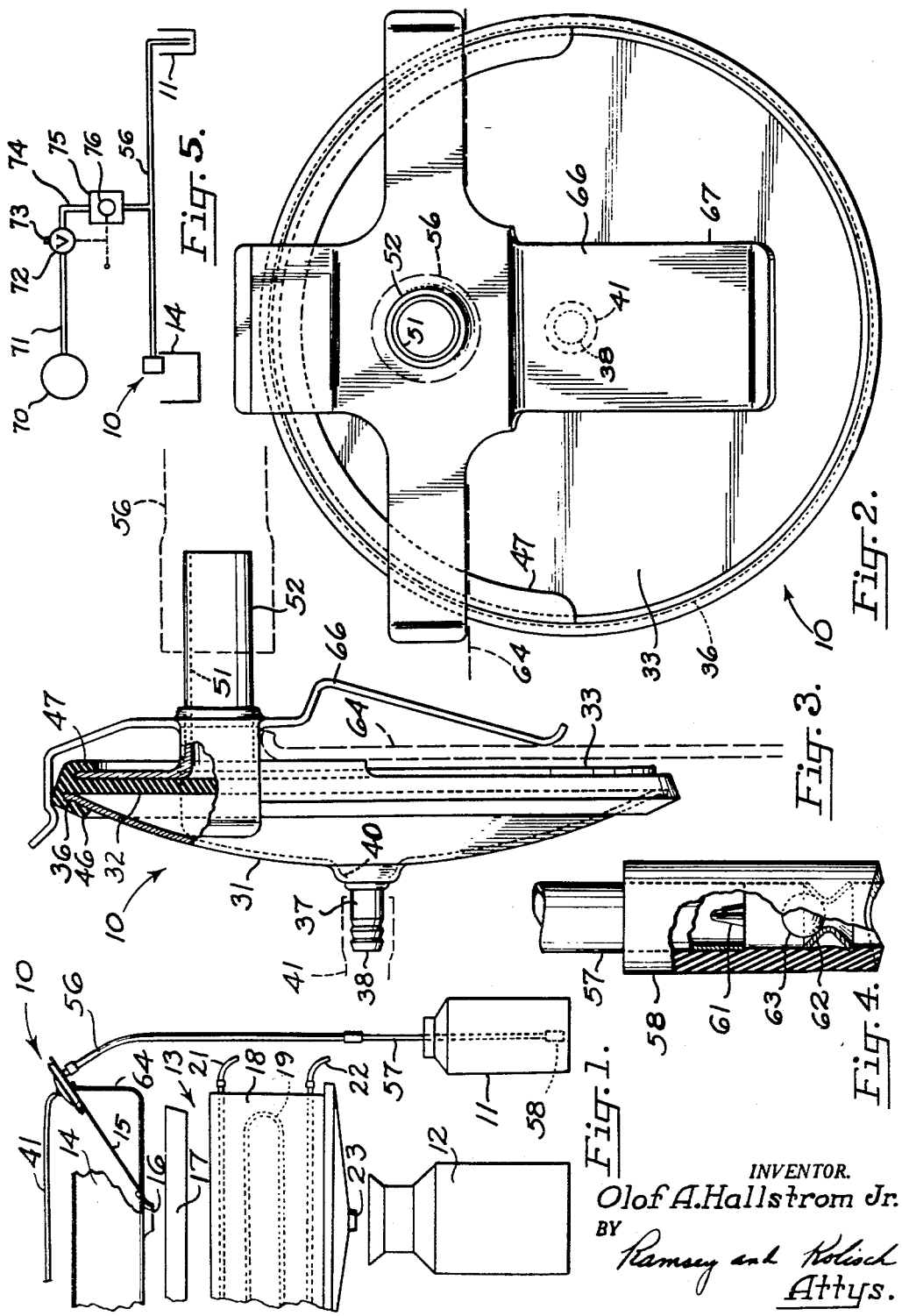

2,934,024

DIAPHRAGM PUMP AND MILK TRANSFER APPARATUS

Olof A. Hallstrom, Jr., Tillamook, Oreg.

Application May 9, 1958, Serial No. 734,160

9 Claims. (Cl. 103—152)

This invention relates to novel pump means and liquid transfer equipment. More particularly, the invention relates to variable pressure actuated, diaphragm pumps, of simple construction and low maintenance requirements. A part of the invention is novel transfer apparatus of the type that may be used in the dairy industry for transferring milk from one receptacle to another.

A general object of the invention is to provide a variable pressure actuated, diaphragm pump having relatively few parts, which is economically produced, the most important, which is readily disassembled to enable thorough cleaning. The latter is important in the milk industry where states have consistently applied high sanitation requirements.

Another general object is to provide transfer apparatus for milk which may be powered by the usual subatmospheric pressure source found in a dairy, requires little supervision, and which is ideally suited for handling milk without agitation of the milk so as to cause frothing, separation, etc.

In the dairy industry, it is frequently necessary to transfer quantities of milk from one location to another. For example, a dairyman after milking his cows quite often will treat his milk by passing it through an aerator-cooler to cool and otherwise to condition the milk. In the past, the practice has been either to hoist a milk can and pour the contents thereof directly into the aerator-cooler, or, if the operation is big enough to justify the cost, to pour the milk from the cans in which it has been collected into a collecting receptacle, and pump the contents of the receptacle using a centrifugal pump into the aerator-cooler. Each of these systems requires close supervision and attention by the dairyman. If a pump is used, the equipment has been expensive, and difficult to clean.

This invention contemplates liquid transfer apparatus for milk wherein pumping of the milk is produced by means of a variable pressure actuated, diaphragm pump of unique and novel construction. The pump may be energized using a subatmospheric, or so-called "vacuum," source. Specifically, the pump comprises a concave or dished plate member, a flexible and resilient diaphragm member extending over and covering the concave face of the dished plate member (and held on the plate member by means of an annular lip or bead integral with the diaphragm and extending around its periphery), and a substantially flat, flapper plate member mounted over the side of the diaphragm opposite the side which faces the concave face of the dished plate member. The latter is secured to the diaphragm member by a second lip or bead integral with the diaphragm and fitted over an edge portion of the flapper plate. The latter lip, however, extends only partially about the periphery of the flapper plate member. A large portion of the periphery of the flapper member remains unconnected or loose from the diaphragm, and is free to swing away from the diaphragm.

The chamber defined by the diaphragm and the concave face of the dished plate functions as the actuating chamber for the pump. An inlet port is provided in the dished plate member to accommodate the introduction of fluctuating pressure thereto. The diaphragm moves away from the flapper plate and toward the dished plate member during a portion of the pumping cycle. When this occurs, liquid is "sucked" through a suitable port in the flapper plate between the diaphragm member and flapper plate.

When the diaphragm member returns to its original position during another portion of the pumping cycle, the liquid newly introduced between the flapper plate member and the diaphragm member is forced against the flapper plate. This causes the flapper plate to swing away from the diaphragm. As a result, an elongated slot is presented around the edge of the flapper plate between the flapper plate and diaphragm for liquid discharge.

It is contemplated that the pump be mounted on a wall of a receptacle so that this slot produced by movement of the flapper plate is disposed substantially parallel to the wall mounting the pump. A fan-shaped discharge takes place by reason of the configuration of the discharge opening of the pump, which is directed against the wall of the receptacle. This fan-shaped discharge wipes the face of the wall, and liquid falls from the pump without frothing or churning. This is particularly important in the handling of milk, where milk separation is a problem.

According to an embodiment of the invention, the inlet port of the flapper member is connected by an elongated flexible feed conduit to a hollow rod member. This rod member is insertable into a milk can, with the base of the rod member resting adjacent the bottom of the can. The rod member is moved from one milk can to another as the cans are emptied. Where state regulations permit, milk cans may be emptied and the contents cooled using a relatively long feed conduit, and running the feed conduit from milk cans located in the milking parlor to the pump and an aerator-cooler located in a separate building. This invention contemplates the provision of an automatically controlled air bleeder means for ridding the feed conduit of air when a long feed conduit is used.

Included in the objects of the invention, therefore, is a novel pump system for milk wherein the milk is discharged from the pump in the form of a fan-type jet sweeping over the wall of a receptacle thereby to inhibit frothing and churning of the milk. A further object is the provision of a novel pumping system which lends itself to the transfer of milk over a relatively long distance.

These and other objects and advantages are attained by the invention, which is described hereinbelow in conjunction with the accompanying drawings wherein:

Fig. 1 illustrates milk transfer apparatus constructed according to this invention, showing the apparatus in conjunction with a conventional aerator-cooler for milk, and with the diaphragm pump portion of the apparatus mounted on an inclined, insertable receptacle wall;

Fig. 2 is a plan view of the diaphragm pump of the invention, with the pump carried on a mounting bracket of a type that may be used in mounting the pump;

Fig. 3 is a side view of the pump in Fig. 2, partially broken away;

Fig. 4 is a view of the inlet end of the hollow rod used as part of the conduit means for delivering milk to the pump; and Fig. 5 is a schematic view illustrating a construction for bleeding air from the delivery conduit means.

Referring now to the drawings for a description of a specific embodiment of the invention, and in particular to Fig. 1, 10 indicates generally a variable pressure actuated, diaphragm pump operating to transfer milk from a milk can 11 to a milk can 12 through an aerator-cooler indicated generally at 13. The aerator-cooler is conventional, and may include a collection trough 14 having at its base discharge opening 16. Opening 16 feeds milk into a screening or distributing member 17, which has a series of perforations in its base (not shown) through which milk drips into the cooler portion 18 of the aerator-cooler. Portion 18 comprises a receptacle with upstanding side and end walls, and has extending therethrough a serpentine cooler line 19 cooled by water flowing therethrough between conduits 21, 22. After passing through portion 18 of the cooler, milk drops from an opening 23 at the base of portion 18 where it falls into can 12. Pump 10 is shown mounted on an inclined, insertable receptacle wall 15 which is separable from trough 14. A base edge of wall 15 rests against an appropriate support shoulder at the base of the trough, with an upper portion of the wall resting on an end wall of trough 14.

With reference now more particularly to Figs. 2 and 3, the variable pressure actuated, diaphragm pump of the invention comprises a recessed or dished plate member 31, a flexible and resilient diaphragm 32 stretched over the concave face of member 31, and a flapper plate member 33 substantially coextensive with diaphragm 32 mounted over the side of diaphragm 32 opposite the side facing member 31. When at rest, the flapper plate is held with the peripheral edge thereof snugly adjacent the diaphragm.

Plate member 31 ordinarily is made of steel or other rigid material. Preferably stainless or crome-plate steel is used for reasons of cleanliness. The plate member has a circular outline, and terminates along its peripheral edge in a small annular shoulder 36.

Centrally of the plate member and extending therethrough is a port 37. The port is defined at one end by the cylindrical bore provided within the interior of a nipple 38. The other end of port 37 is defined by a small indent 40 in member 31. Thus the port flares out at this other end. Nipple 38 is received within the interior of an elongated flexible tube 41, which is connected at its other end to a conventional vacuum-operated pulsator (not illustrated). The pulsator creates a pulsating pressure in tube 41, fluctuating between atmospheric and subatmospheric. Thus port 37 constitutes a means for admitting a variable subatmospheric pressure to the pump.

Diaphragm 32 is flexible and resilient, and is made of rubber or similar material, preferably a synthetic such as neoprene or the like. The diaphragm member is substantially coextensive with plate member 31 and has provided around its peripheral edge a continuous reversely turned lip or bead 46, turned over the side of the diaphragm member which is opposite the concave face of member 31. Lip 46 together with adjacent marginal portions of the diaphragm define a continuous annular groove which sealingly fits about annular shoulder 36. The connection so provided its substantially air tight.

Flapper plate 33, which may also be comprised of stainless or chrome-plated steel, is substantially flat, and is also coextensive with the diaphragm. The plate has extending therethrough inwardly of its peripheral edge and upwardly of its radial center a port 51 defined by the interior walls of nipple 52. Port 51 constitutes a conduit or feed means for delivering fluid to the pump. On mounting the pump as shown in the embodiment of Fig. 1, nipple 52 is inserted through an accommodating hole formed in wall 15, and thus the pump is prevented from sliding down the wall.

Around a portion of the peripheral edge of the diaphragm member, and reversely turned over the side facing flapper member 33, is another reversely turned lip or bead 47. This has a semi-circular outline, and extends around the upper half of the peripheral edge of the diaphragm member only.

Flapper plate 33 is held in place with its peripheral edge snugly adjacent the diaphragm member, by seating an upper edge portion of the flapper plate under lip 47. When the pump is at rest, the resiliency of the material making up the diaphragm and lip 47 causes the lower edge portion of plate 33 to rest relatively tightly on the diaphragm.

Nipple 52 is connected by a conduit 56 to a hollow, rigid rod 57 at the intake end of the apparatus illustrated. Rod 57 is placed within a full can of milk (represented by can 11), with its inlet end adjacent the base of the can.

Referring to Figs. 1 and 4, a fitting 58 is secured to the lower end of rod 57. The fitting has a hollow interior which loosely mounts a ball 63. The travel of ball 63 is limited in one direction by flutes 61 at the base of rod 57, and in the other direction by a valve element 62. Ball 63 has a smaller diameter than the inner diameter of rod 57, so when the ball occupies a position adjacent the fluted end of rod 57, fluid can still flow up into the rod. When the ball is resting on valve element 62, fluid is prevented from flowing downwardly through the valve element.

The pump may be mounted as shown in Fig. 1 on an inclined wall 15, or it may be secured to a vertical wall of trough 14, exemplified by wall 64, using means such as a cruciform-shaped bracket 66. When the bracket is employed, lower edges of the lateral extensions of the bracket rest on the top edge of wall 64, and a depending leg 67 of the bracket clamps against the outer face of the wall. The bracket is provided with a suitable bore accommodating nipple 52.

In operation of the apparatus so far described, rod 57 is inserted into a milk can, and a pulsating pressure varying from atmospheric to subatmospheric admitted to the actuating chamber of the pump. The latter is defined by one face of the diaphragm member and the concave face of plate member 31. A pulsating rate of approximately 80 cycles per minute has been found most satisfactory.

During the subatmospheric portion of a pumping cycle, central portions of the diaphragm are stretched and moved from right to left in Fig. 3 toward the concave face of member 31. This creates a space between the flapper plate and the diaphragm member bounded round about by the snug fit between the periphery of the flapper plate and the diaphragm. This space constitutes the pumping chamber. This space is filled with milk flowing through conduit 56 and nipple 52. Substantially little air leakage occurs inwardly around the edges of the flapper plate.

Having collected a body of milk, when the pressure in the actuating chamber returns to atmospheric, the diaphragm member moves from left to right in Fig. 3, and forces the milk collected in the pumping chamber against the inner face of the flapper plate member. The pressure created swings the flapper plate member about its upper edge with its lower edge moving outwardly. Discharge of milk then takes place in the gap created. The discharge takes place through the elongated slot which is opened up around the lower half of the flapper plate member between the ends of lip 47. Gravitational pull on the milk assists in clearing milk from the pumping chamber. The fan-shaped discharge produced is directed against the wall mounting the pump, and the milk flows down the wall to the base of the trough.

If a pulsating rate of approximately 80 cycles per minute is used, diaphragm 32 oscillates rapidly enough to cause a substantially continuous flow of milk from the pump. Further, the kinetic energy of the milk moving up through conduit 56 is sufficient to keep any substantial back flow of milk from occurring through conduit 56. With lower pulsating rates, the ball check construction illustrated in Fig. 4 is desirable, to prevent back flow of milk on the return of the diaphragm.

Bore 37 in extending through plate 31 flares out at its inner end as described, so that a larger area must be covered by the diaphragm before the diaphragm will act to seal off the source of subatmospheric pressure. It is preferable to locate the bore centrally in dished member 31, so that it is as far away from the diaphragm as possible. This also tends to prevent premature plugging of the low pressure source.

In Fig. 5 there is illustrated a modification of the invention. Here a vacuum pump 70 is connected to conduit 56 leading from can 11 to the diaphragm pump by a valve controlled conduit 71. Conduit 71 has a two-position valve 72 controlling the inflow thereto, which may be either from a relief port 73 of valve 72 or from conduit 74. Valve 72 is automatically regulated by a float member 76 connected to the valve and mounted in a chamber 75.

With long conduit lines, such as may be used in transferring milk from a milking parlor to an aerator-cooler located in a separate building, it may be desirable to bleed air from conduit 56 before operation of the diaphragm pump. Conduit 71 and valve 72 accommodate this bleeding of air, which is automatically terminated when float member 76 rises in chamber 75 by the admission of milk into the chamber. When the float member rises, line 74 is closed and line 73 opened by valve 72.

It is claimed and desired to secure by Letters Patent:

1. Milk transfer apparatus for transferring milk from a milk supply to a receiving receptacle comprising a variable pressure actuated diaphragm pump, said pump having a diaphragm and wall portions defining an actuating chamber and a pumping chamber separated by the diaphragm of the pump, first conduit means for admitting variable pressure to said actuating chamber, second conduit means connecting said pumping chamber to said milk supply, and means mounting said pump adjacent a wall of said receptacle, said pump having a discharge opening for said pumping chamber in the shape of an elongated relatively thin slot arranged parallel to and closely adjacent said wall and operable to eject a fan-shaped discharge against said wall.

2. A variable pressure actuated pump comprising a recessed member having walls defining a cavity therein open at one side, a flexible diaphragm sealingly closing said open side, said diaphragm and said walls of said recessed member defining an actuating chamber, inlet means extending through said recessed member for connecting a variable pressure source to said actuating chamber, a flapper member, means operatively connected to the recessed member yieldably mounting said flapper member in covering relation over the side of said diaphragm facing away from said recessed member with the peripheral edge of said flapper member snugly adjacent said diaphragm, at least a portion of the peripheral edge of said flapper member being loose from said diaphragm, and an infeed port extending through said flapper member.

3. A variable pressure actuated pump comprising a dished plate member with one face thereof defining a smoothly contoured concave recess, means defining an inlet port extending centrally through said plate member, said port having a flared out end where it communicates with said one face, a diaphragm member of flexible material extending over said one face and having around the peripheral edge thereof a continuous lip portion reversely turned over the side of said diaphragm member facing said one face of said plate member, said lip portion together with adjacent marginal portions of said diaphragm member defining a groove sealingly fitted over the peripheral edge of said plate member, a second substantially flat plate member mounted in covering relation over the other side of said diaphragm member, said diaphragm member having at the peripheral edge thereof a second reversely turned lip portion turned over said other side of said diaphragm member extending only partially around the peripheral edge thereof, said second lip portion together with adjacent marginal portions of said diaphragm member yieldably holding said second plate member with the peripheral edge thereof snugly against said diaphragm member, and an infeed port extending through said second plate member.

4. A three-piece variable pressure actuated pump comprising a dished plate member with one face thereof defining a smoothly contoured concave recess, means defining an inlet port extending through said plate member communicating at one end with said recess, a diaphragm member of flexible and resilient material having around its peripheral edge a continuous lip portion reversely turned over one side of the diaphragm member, said lip portion with adjacent marginal portions of said diaphragm member defining a groove sealingly mounting said diaphragm member on said plate member with said one side of the diaphragm member facing said recess, and a flapper plate member substantially coextensive with said diaphragm member mounted over the other side of said diaphragm member, said flapper plate having an infeed port extending therethrough, said diaphragm member having a second lip portion extending partially around the peripheral edge thereof reversely turned over its other side and yieldably holding said flapper plate with the peripheral edge thereof snugly against said diaphragm member.

5. A variable pressure actuated pump comprising a recessed member having walls defining a cavity therein open at one side, a flexible diaphragm sealingly closing said open side, said diaphragm and said walls of said recessed member defining an actuating chamber, inlet means extending through said recessed member for connecting a variable pressure source to said actuating chamber, a flapper plate mounted over the side of said diaphragm facing away from said recessed member, said flapper plate having an infeed port extending therethrough, and clamping means integral with said diaphragm yieldably holding said flapper plate snugly against said diaphragm, said clamping means accommodating movement of portions of said flapper plate away from said diaphragm.

6. Milk transfer apparatus transferring milk from a milk supply to a receiving receptacle comprising a variable pressure actuated pump; said pump having a recessed member with walls defining a cavity therein open at one side, a flexible diaphragm sealingly closing said open side, said diaphragm and said walls of said recessed member defining an actuating chamber, inlet means extending through said recessed member for connecting a variable pressure source to said actuating chamber, a flapper member, means operatively connected to the recessed member yieldably mounting said flapper member with the peripheral edge thereof snugly adjacent the side of said diaphragm facing away from said recessed member, at least a portion of the peripheral edge of said flapper member being disconnected from said diaphragm, an infeed port extending through said flapper member; means mounting said pump against a wall of said receptacle; and conduit means connecting said inlet means with said milk supply.

7. In a diaphragm pump having a diaphragm movable in response to pressure fluctuations and means mounting said diaphragm, the means mounting the diaphragm having wall portions defining with one side of said diaphragm an actuating chamber, a flapper plate member substantially coextensive with said diaphragm mounted over the other side of said diaphragm, said flapper plate member having an infeed port extending therethrough, and a lip portion integral with said diaphragm extending partially around the peripheral edge thereof reversely turned over said other face, said lip portion yieldably holding the peripheral edge of said flapper plate member snugly against said diaphragm.

8. A variable pressure actuated pump comprising a dished plate member with one face thereof defining a smoothly contoured concave recess, means defining an inlet port extending centrally through said plate member, said inlet port having a flared out end where it communicates with said one face, a diaphragm member of flexible and resilient material extending over said one face and having around the peripheral edge thereof a continuous lip portion reversely turned over the side of said diaphragm member facing said one face of said plate member, said lip portion together with marginal portions of said diaphragm member defining a groove sealingly fitted over the peripheral edge of said plate member, a flapper member and means operatively connected to the dished plate member yieldably mounting said flapper member with its peripheral edge snugly against the other side of said diaphragm member, at least a portion of the edge of said flapper member being loose and movable away from said diaphragm member.

9. Milk transfer apparatus transferring milk from a milk supply to a receiving receptacle comprising a diaphragm pump having a diaphragm movable in response to pressure fluctuations and means defining an actuating chamber on one side of said diaphragm mounting said diaphragm, a flapper member, means operatively connected to the means defining the actuating chamber yieldably mounting said flapper member snugly over the other side of said diaphragm, said flapper member having an infeed port extending therethrough, at least a portion of said flapper member being loose and movable relative to said diaphragm toward and away from said diaphragm, first conduit means for admitting variable pressure to said actuating chamber, second conduit means connecting said inlet port to said milk supply, and means mounting said pump adjacent a wall of said receptacle with movement of said flapper member relative to said diaphragm occurring toward and away from said wall.

References Cited in the file of this patent

UNITED STATES PATENTS

| 1,926,005 | Hueber et al. | Sept. 5, 1933 |
| 2,680,411 | Hein | June 8, 1954 |
| 2,791,964 | Reeve | May 14, 1957 |

FOREIGN PATENTS

| 777,235 | France | Nov. 26, 1934 |